(12) United States Patent
Atherton et al.

(10) Patent No.: US 8,743,292 B2
(45) Date of Patent: Jun. 3, 2014

(54) VIDEO/AUDIO PRODUCTION PROCESSING CONTROL SYNCHRONIZATION

(75) Inventors: Michael James Atherton, Ottawa (CA); Troy David English, Ottawa (CA); Christopher David Welsh, Kanata (CA); Kevin Rockel, Ottawa (CA); Leslie Vincent O'Reilly, Ottawa (CA); Trevor Charles May, Ottawa (CA); Steven David Bland, Woodlawn (CA); David Allan Ross, Nepean (CA)

(73) Assignee: Ross Video Limited, Ottawa, Ontario (CA)

( * ) Notice: Subject to any disclaimer, the term of this patent is extended or adjusted under 35 U.S.C. 154(b) by 159 days.

(21) Appl. No.: 13/361,025

(22) Filed: Jan. 30, 2012

(65) Prior Publication Data

US 2013/0194496 A1    Aug. 1, 2013

(51) Int. Cl.
*H04N 5/91* (2006.01)
*H04N 5/222* (2006.01)
*H04N 9/475* (2006.01)

(52) U.S. Cl.
USPC ............................. 348/722; 348/515; 386/278

(58) Field of Classification Search
USPC .......... 348/706, 515, 722, 588, 578; 386/235, 386/278, 279–282; 715/723; 381/119
See application file for complete search history.

(56) References Cited

U.S. PATENT DOCUMENTS

| | | | | |
|---|---|---|---|---|
| 6,092,119 A | * | 7/2000 | Rossmere et al. | 709/247 |
| 6,324,334 B1 | * | 11/2001 | Morioka et al. | 386/282 |
| 6,546,188 B1 | * | 4/2003 | Ishii et al. | 386/280 |
| 7,283,965 B1 | * | 10/2007 | Michener | 704/500 |
| 8,009,966 B2 | * | 8/2011 | Bloom et al. | 386/285 |
| 2001/0041049 A1 | * | 11/2001 | Kanda | 386/52 |
| 2006/0140580 A1 | * | 6/2006 | Hiroi et al. | 386/52 |
| 2007/0043804 A1 | * | 2/2007 | Fibaek | 709/201 |
| 2007/0286567 A1 | * | 12/2007 | Yanagita | 386/52 |
| 2009/0187826 A1 | * | 7/2009 | Heimbold et al. | 715/719 |
| 2009/0320073 A1 | * | 12/2009 | Reisman | 725/51 |

OTHER PUBLICATIONS

SMPTE 12M-1-2008, Revision of SMPTE 12M-1999, RP 159-1995 and RP 164-1996, SMPTE Standard for Television—Time and Control Code (a.k.a. ST 12-1:2008), 2008, The Society of Motion Picture and Television Engineers, White Plains, NY, cover sheet and pp. 1-40.
SMPTE 12M-2-2008, Revision of RP 188-1999, SMPTE Standard for Television—Transmission of Time Code in the Ancillary Data Space (a.k.a. ST 12-2:2008), 2008, The Society of Motion Picture and Television Engineers, White Plains, NY, cover sheet and pp. 1-18.

* cited by examiner

*Primary Examiner* — Victor Kostak
(74) *Attorney, Agent, or Firm* — Nixon Peabody LLP; Jeffrey L. Costellia (57) ABSTRACT

Video/audio production processing control synchronization apparatus and methods are provided. Processing control commands that are provided to a first installation of production processing equipment for controlling production processing of edit units of first production signals are echoed to another installation, or possibly multiple other installations, of production processing equipment. Timing information associated with the edit units is also provided to the other installation(s), to enable production processing of delayed production signals by the other installation(s) to be synchronized with the production processing by the first installation of production processing equipment. Multiple production processing equipment installations can be controlled and synchronized from a single control interface.

25 Claims, 7 Drawing Sheets

VIDEO/AUDIO PRODUCTION PROCESSING CONTROL SYNCHRONIZATION

FIELD OF THE INVENTION

This invention relates generally to broadcast video/audio equipment and, in particular, to synchronizing control of such equipment.

BACKGROUND

Synchronizing control of multiple pieces of video/audio processing equipment from one control interface involves using a control protocol that is understood by all of the equipment or inserting one or more protocol translators into communication paths between the control interface and each piece of equipment for which control protocol translation is needed. The control interface can be a physical hard control interface, a graphical user interface, a command line interface, or an automation system, for example.

In one possible scenario, two video production processing equipment frames are controlled from one control panel. Messages from one control panel are echoed to both equipment frames so that both equipment frames receive the same instructions. An instruction could be to change the current video source from Video Input 3 to Video Input 1, for instance. Both equipment frames would receive the same control message and act upon it. If the communication paths in a control network through which control messages are transmitted have very limited latency, then both equipment frames will act upon the same command within the same frame of video. In this manner, two simultaneous and identical video productions can be executed by two processing equipment frames under the control of one user using one control panel.

Jitter in the control network or different latencies in the control network from the control interface to each piece of video/audio processing equipment, for example, can affect the ability to have each piece of equipment act on the same command within the same frame of video. This issue can be compounded where both jitter and differing latency conditions exist.

SUMMARY

According to one aspect of the invention, an apparatus includes: a first interface to receive processing control commands that are provided to production processing equipment for controlling production processing of production signals by the production processing equipment, the production signals including one or more video signals, one or more video/audio signals, or both one or more video signals and one or more video/audio signals; a second interface to enable communications with a controller that controls processing of delayed second production signals by second production processing equipment, the second production signals being related to the production signals; and a message generator operatively coupled to the first interface and to the second interface, to provide the received processing control commands, and timing information associated with edit units of the production signals for which the processing control commands control the production processing equipment, to the controller for synchronizing control of production processing of the delayed second production signals by the second production processing equipment with the control of the production processing of the production signals by the production processing equipment.

The processing control commands could be provided to the production processing equipment by a command generator, with the first interface being operatively coupled to the command generator to receive the processing control commands from the command generator.

The first interface could instead be operatively coupled to the production processing equipment to receive the processing control commands from the production processing equipment.

The apparatus might also include a timing information insertion element operatively coupled to the production processing equipment, to receive the production signals, to insert the timing information into the production signals, and to provide the production signals with the inserted timing information to the production processing equipment.

In some embodiments, the message generator embeds the timing information into messages that include the processing control commands for transmission to the controller.

The timing information could be or include timecode indices, in which case the delayed second production signals also include the timecode indices.

The production processing commands could be provided to the production processing equipment for edit units of the production signals preceding edit units associated with the timing information by a time period based on an amount of delay of the delayed second production signals relative to the production signals.

A system could include such an apparatus, the production processing equipment, and the second production processing equipment.

Another apparatus includes: a command interface to receive processing control commands that control production processing of edit units of first production signals by first production processing equipment, and timing information associated with the edit units of the first production signals, the first production signals including one or more video signals, one or more video/audio signals, or both one or more video signals and one or more video/audio signals; and a controller operatively coupled to the command interface, to synchronize control of production processing of delayed second production signals by second production processing equipment with the control of the production processing of the first production signals by the first production processing equipment, the second production signals being related to the first production signals.

The delayed second production signals could include timing information associated with edit units of the delayed second production signals, in which case the apparatus might also include a timing interface to receive the timing information associated with edit units of the delayed second production signals. The controller could then synchronize control of production processing of the delayed second production signals by the second production processing equipment with the control of the production processing of the first production signals by the first production processing equipment, based on the received processing control commands, the received timing information, and the timing information associated with edit units of the delayed second production signals.

The timing information associated with edit units of the delayed second production signals might be or include timing information generated by a timing information generator and inserted into the second production signals.

In some embodiment, the timing information includes timecode indices and the delayed second production signals also include the timecode indices.

The controller could adjust the received timing information by a time period based on an amount of delay of the delayed second production signals relative to the first production signals.

The processing control commands could include processing control commands generated by a control panel operatively coupled to the first processing equipment. The command interface could be operatively coupled to receive the processing control commands and the timing information from the control panel or from the first production processing equipment.

A method according to another aspect includes: providing processing control commands to production processing equipment for controlling production processing of production signals by the production processing equipment, the production signals comprising one or more video signals, one or more video/audio signals, or both one or more video signals and one or more video/audio signals; and providing the processing control commands and timing information associated with edit units of the production signals for which the processing control commands control the production processing equipment, to a controller of second production processing equipment for synchronizing control of production processing of delayed second production signals by the second production processing equipment with the control of the production processing of the production signals by the production processing equipment, the second production signals being related to the production signals.

Providing the processing control commands and timing information to the controller could involve: inserting the timing information into messages that include the processing control commands; and transmitting the message to the controller.

The method could also include: receiving the processing control commands and the timing information at the controller; and applying the processing control commands to the second production processing equipment to control processing of the delayed second production signals.

Another method includes: receiving processing control commands that control production processing of edit units of first production signals by first production processing equipment, and timing information associated with the edit units of the first production signals, the first production signals comprising one or more video signals, one or more video/audio signals, or both one or more video signals and one or more video/audio signals; and synchronizing control of production processing of delayed second production signals by second production processing equipment with the control of the production processing of the first production signals by the first production processing equipment, the second production signals being related to the first production signals.

The method could also include: providing the delayed second production signals by delaying the second production signals; extracting from the delayed second production signals timing information associated with edit units of the delayed second production signals; and synchronizing based on the received processing control commands, the received timing information, and the extracted timing information.

In some embodiments, the method involves, prior to the delaying: receiving timing information for the second production signals; and inserting the timing information for the second production signals into the second production signals.

A non-transitory machine-readable storage medium could be used to store instructions which, when executed by one or more processing devices, perform such methods.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
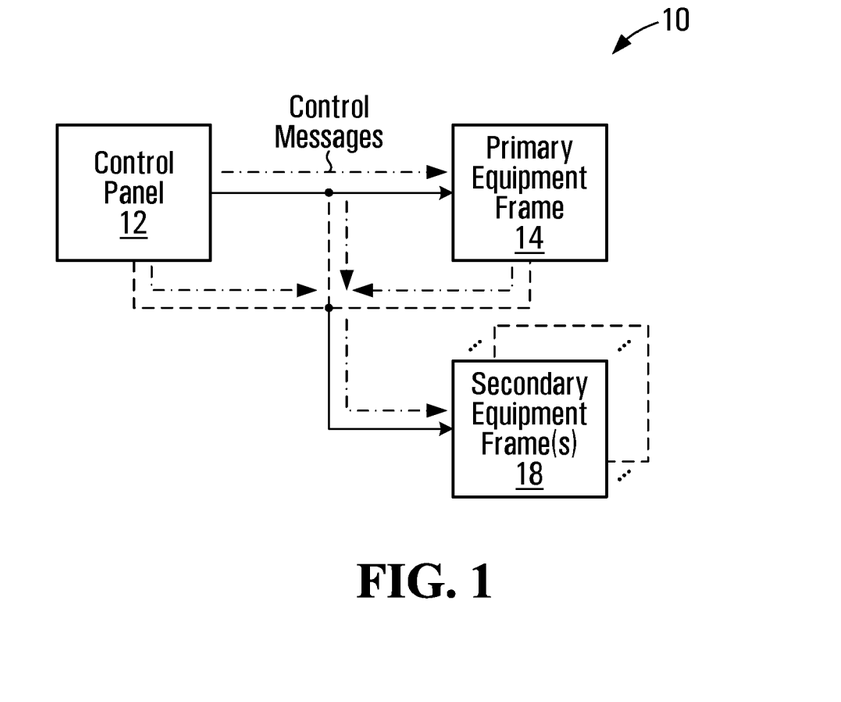
FIG. 1 is a block diagram of an example production system.

FIG. 1 is a block diagram of an example production system 10. The example production system 10 includes a control panel 12, a primary equipment frame 14, and one or more secondary equipment frames 18. The control panel 12, which could be a video production switcher control panel for instance, is an example of a control interface that could be used to control processing of video inputs by both the primary equipment frame 14 and the secondary equipment frame(s) 18. Control messages are provided from the control panel 12 to the primary equipment frame 14 in the example shown, and are also provided to the secondary equipment frame(s) 18 by the control panel, by the primary equipment frame, or by some other element coupled to the control panel and/or the primary equipment frame.

In some production systems, the primary equipment frame 14 could be provided for processing high definition video inputs and a secondary equipment frame 18 could be provided for processing standard definition video inputs corresponding to the high definition video inputs. One user could then control both the primary and secondary equipment frames 14, 18 simultaneously using the control panel 12, to produce a high definition production and a standard definition production concurrently. If the communication paths in a control network through which control messages are transmitted to the primary and secondary equipment frames 14, 18 have very limited latency, then both of the equipment frames will act upon the same command within the same frame of video. As described herein, timing information can be used to coordinate control of the secondary equipment frame(s) 18 with control of the primary equipment frame 14 even in implementations where the control network has higher latency and/or jitter.

Timecode is a method of indexing a video stream, according to which each individual edit unit, such as an image frame or field, in a video stream is assigned a unique index number. It should be appreciated that edit units could be defined and indexed to provide any desired level of "granularity" for processing control. An edit unit could include multiple image frames or fields, for instance, in which case one timecode value or other index number could be assigned to multiple frames. These index numbers can be carried inside the video stream, in the ancillary data area of the video stream for instance. A timecode signal can also or instead be distributed by itself, to multiple pieces of equipment for example.

One common timecode method is described by the Society of Motion Picture and Television Engineers (SMPTE) as a set of standards, denoted SMPTE 12M-1 and SMPTE 12M-2. In 12M-1 and 12M-2, timecode indices are in the form of "Hours:Minutes:Seconds:Frames", and sometimes with a field indicator. Network Time Protocol (NTP) timestamps are another example of timing information that could be employed in synchronizing control of video/audio production processing. It should be appreciated that the present disclosure is in no way limited to using only these types of timing information. Timing information could, but need not necessarily, be or include timecode indices and/or NTP timestamps.

The same timecode signal could be distributed to all of the video/audio production equipment in a production system, so as to provide a common time or reference base to that equipment. However, timecodes are not used to synchronize control of multiple pieces of such equipment from a single control interface, where command messages or other forms of command information are transmitted from the control interface through a control network that experiences jitter and/or differing latency between a control interface or other control or command generator and each video/audio processing equipment frame, in the manner disclosed herein.

Figure 2:
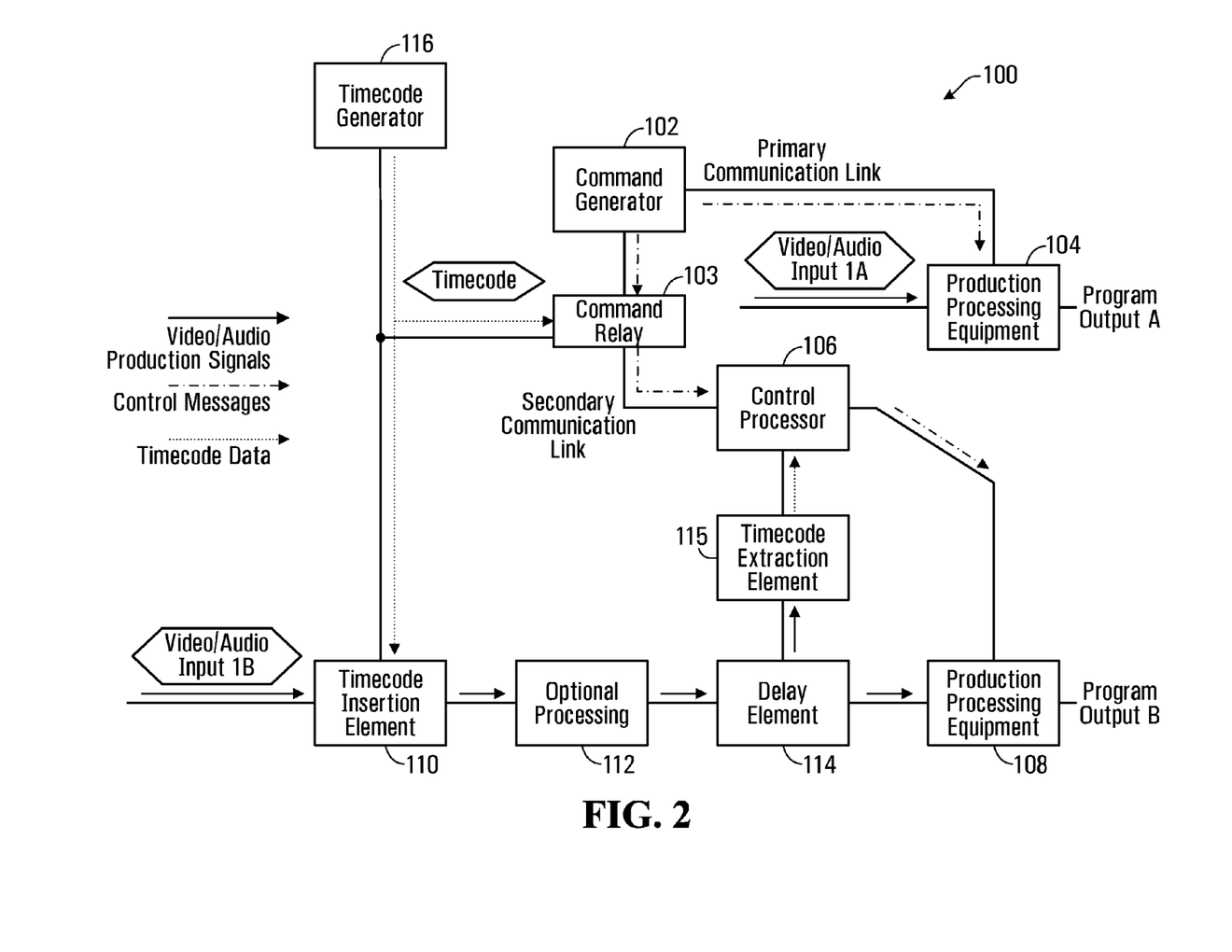
FIG. 2 is a block diagram of another example production system.

FIG. 2 is a block diagram of another example production system. The example production system 100 includes a command generator 102, a command relay 103, two installations of production processing equipment 104, 108, a control processor 106, a timecode insertion element 110, an optional processing element 112, a delay element 114, a timecode extraction element 115, and a timecode generator 116, operatively coupled together as shown. It should be appreciated that the example production system of FIG. 2, as well as the contents of the other drawings, are intended solely for illustrative purposes, and that the present disclosure is in no way limited to the particular example embodiments explicitly shown in the drawings and described herein.

In general, components of the example production system 100 could be implemented using hardware, firmware, processing devices that execute software, or some combination thereof. Microprocessors, Application Specific Integrated Circuits (ASICs), Field Programmable Gate Arrays (FPGAs), and Programmable Logic Devices (PLDs) are examples of processing devices that could be used to execute software.

The command generator 102 could be in the form of a physical control panel in a production switcher, for example, with the production processing equipment 104 including one or more production processing devices in an equipment frame. This part of the system might represent a substantially conventional setup, with a control panel being used to control production processing equipment. In accordance with embodiments of the invention, however, the same command generator 102 can also be used to control a second installation of production processing equipment 108 through the control processor 106 in the example production system 100. With reference to both FIGS. 1 and 2, the command generator 102 could be or include a control panel 12, and the production processing equipment 104, 108 could be or include primary and secondary processing equipment frames 14, 18. Although the command relay 103 is shown separately from the command generator 102 in FIG. 2, a control panel such as 12 could include both a command generator and a command relay. The example system 100 represents a scenario from FIG. 1 in which control messages with timing information are relayed to the secondary equipment frame 18 from the control panel 12.

It should be appreciated that the command generator 102 is in no way limited to a video production switcher control panel. The command generator 102 might also or instead include an automation system. The command generator 102 is intended to generally denote a source of commands to control the production processing equipment 104, 108. There could be one or more command generators 102, such as a control panel and an automation system and/or other control generators of different types, through which the production processing equipment 104, 108 are controlled.

The control processor 106 could be implemented, for example, in a computer or other processing device that is separate from the command generator 102, and possibly as a component within the production processing equipment 108.

The production processing equipment 108 could include one or more production processing devices having the same input connections and internal connections as the production processing device(s) of the production processing equipment 104. Identical devices could be provided at 104, 108 where both installations of the production processing equipment are to perform coordinated production processing on related production signals, for example. Related production signals could be corresponding high definition and standard definition video inputs, signals to be used in a multilingual broadcast where different graphics are provided in different languages, or other types of signals to which a user might want to simultaneously apply the same type of production processing to concurrently produce multiple productions.

A timecode signal can be inserted into a video signal, such as into the ancillary data area of a video signal, as noted above. The timecode insertion element 110 represents a device that could be implemented using hardware, firmware, and/or one or more processing devices that execute software, to insert timecode indices into video/audio production signals in the example shown. Other types of timing information than timecode indices could be used in other embodiments. The exact structure or implementation of the timecode insertion element 110 could vary depending on the type of timing information to be inserted into production signals and/or the types of production signals into which the timing information is to be inserted. In one embodiment, the timecode insertion element 110 is an element that inserts timing information into the ancillary data of video signals. The timecode extraction element 115 extracts timing information from production signals, and its structure and operation could be at least in part dependent upon that of the timecode insertion element 110.

The optional processing element 112 in FIG. 2 represents one or more processing components that might be provided in some embodiments to perform additional processing on a video/audio input production signal. Such additional processing may vary greatly between different implementations.

Many examples of time delay elements that could be used to implement the delay element 114 may be or become apparent to those skilled in the art. For example, production signals could be written to and subsequently read from one or more memory devices, such as solid state memory devices. Processing paths for different production signals could potentially use different delay elements, or even different types of delay elements.

As described in further detail herein, timing information, such as timecode indices in the example production system 100, is used to coordinate control of the production processing equipment 108 with control of the production processing equipment 104. FIG. 2 shows timecode data being provided from the delay element 114 to the control processor 106 by the timecode extraction element 115. However, timecode data extraction could instead be implemented within the delay element 114 or within the control processor 106, rather than separately from both the control processor and the delay element as shown.

The timecode generator 116 includes a timer, clock, or other form of timing component that provides a time varying signal for indexing edit units of production signals. A timer or clock that increments (or decrements) once per image frame or field in a video stream, for example, could be used to generate timecode indices or other timing information disclosed herein where an edit unit is an image frame or field. More generally, timing information could include a unique number that is associated with every edit unit of a production signal and increments (or decrements) at a known rate.

Interconnections between the components in the example production system 100 may include any of various types of connections. The primary communication link between the command generator 102 and the production processing equipment 104, for example, might include physical connections through control cables and/or other physical conductors. Network connections between the command generator 102 and the production processing equipment 104, through wired and/or wireless connections, are also contemplated. The secondary communication link between the command relay and the control processor 106 could include the same type(s) of connection as the primary communication link. In one embodiment, the primary communication link is through one or more cables and the secondary communication link is through a communication network. The control processor 106 and the production processing equipment 108 could be interconnected through the same type of connection as the command generator 102 and the production processing equipment 104, or through a different type of connection. The delay element 114 and the timecode extraction element 115 are co-located with the control processor 106 and the production processing equipment 108 in some embodiments, and therefore could similarly be interconnected with those components through one or more local connections, although again different connection types are contemplated. The types of connections between the timecode insertion element 110, the optional processing element 112, the timecode generator 116 and other components might also vary in different embodiments, depending on their relative locations for instance. In some embodiments, the timecode generator 116 is co-located with either the command relay 103 or the timecode insertion element 110.

In operation, the production processing equipment 104 is controlled in a substantially conventional manner from the command generator 102, and can be considered a form of a master production processing engine. The command generator 102 sends control messages to the production processing equipment 104 over the primary communication link. The command relay 103 also receives the control messages from the command generator 102, as well as timecode information from the timecode generator 116 in the example production system 100. The command relay 103 sends duplicate control messages to the control processor 106. These duplicate control messages are sent by the command relay 103 with separate or embedded timecode information. In the example production system 100, the timecode information could be embedded into the duplicate control messages by the command generator 102.

Timecode information for the delayed production signals is embedded into the delayed production signals by the timecode insertion element 110 in the example production system 100, and is available to the control processor 106 from the timecode extraction element 115. Each incoming control message is buffered by the control processor 106, and is dispatched to the production processing equipment 108 in time to match the edit unit of the delayed production signals to which the control message is to be applied. The production processing equipment 108, which may be considered a form of a slave video processing engine, provides one or more outputs delayed by a fixed amount relative to the corresponding output(s) of the production processing equipment 104.

The delay, which is applied by the delay element 114 in the example production system 100, is large enough to accommodate the maximum latency and jitter on the secondary communication link such that production processing by the production processing equipment 108 is edit unit (illustratively frame or field) accurate and synchronized to match the production processing by the production processing equipment 104. Although the results of production processing in FIG. 2 are shown as Program Output A from the production processing equipment 104 and as Program Output B from the production processing equipment 108, production processing as controlled by a production switcher, for example, could provide other types of outputs in addition to or instead of program outputs.

One of the many possible applications of this type of control synchronization would be to have one video processing equipment frame (e.g., at 104) receive all standard definition video inputs and another video processing equipment frame (e.g., at 108) receive corresponding high definition video inputs. One user could then control both equipment frames simultaneously to produce a standard definition production and a high definition production concurrently.

Considering operation of the example processing system 100 in more detail, the production processing equipment 104 is fed as an input production signal the Video/Audio Input 1A. The production processing equipment 104 may have as few as 1 video/audio input signal or as many as thousands of video/audio input signals from various sources. FIG. 2 shows only one production signal input for simplicity, but it should be understood that this is representative of one or more production signals that may include one or more video signals without audio, and/or one or more video/audio signals with both video and audio.

The Video/Audio Input 1B production signal may similarly include video signals, with or without audio, and is related to the Video/Audio Input 1A. For example, the Video/Audio Input 1A could be a duplicate of the Video/Audio Input 1B, or might include standard definition versions of high definition video signals in the Video/Audio Input 1B or different languages in a graphic or some other relationship. There may be other types of relationships between production signals for which control of production processing by multiple equipment installations is to be synchronized. The timecode insertion element 110 inserts timecode information into the Video/Audio Input 1B, illustratively into the ancillary data area in each video stream in the Video/Audio Input 1B. Where the input production signal Video/Audio Input 1B includes multiple signals, the timecode information could be inserted into one signal or into more than one signal to enable synchronization of production processing at the production processing equipment 108.

Additional processing at the optional processing element 112 could be optional on an input-by-input basis. The type(s) of additional processing performed by the optional processing element 112 may vary greatly. An example process would be a conversion of standard definition video into high definition video, or an inverse conversion. For instance, if the Video/Audio Input 1A and the Video/Audio Input 1B are the same high definition video signals, then the optional processing element at 112 could convert the Video/Audio Input 1B from high definition to standard definition, to enable simultaneous high and standard definition productions by one user. Some production signal inputs may have multiple optional processes applied serially at 112.

Optional processing at 112 may add delays, which could be different for different inputs. The delay element 114 is configured to delay the input production signal to ensure that all production signal inputs arrive at the production processing equipment 108 at the same time, regardless of differing delays in the optional processing element 112, and to account for the maximum jitter and/or latency differences between the primary and secondary communication links. In some embodiments, the command generator 102 and the production processing equipment 104 are co-located, and the control processor 106 and the production processing equipment 108 are also co-located but at a different location from the control interface. The respective primary communication links, between the command generator 102 and the production processing equipment 104 and between the control processor 106 and the production processing equipment 108, might then be expected to have low latency and low or substantially no jitter, whereas the secondary communication link between the command relay 103 and the control processor could be affected by higher jitter and/or latency.

Timecode information is extracted from the delayed production signal and provided to the control processor 106 by the timecode extraction element 115. Where the production signal includes multiple signals with embedded timecode information, the timecode information could be extracted from any one of the signals, since those signals should be aligned in time after the delay is applied by the delay element 114.

Control messages that are received by the control processor 106 from the command relay 103 are buffered and dispatched to the production processing equipment 108 when the timecode embedded into each control message matches the delayed production signal in the chain supplying the Video/Audio Input 1B to the production processing equipment 108.

Figure 3:
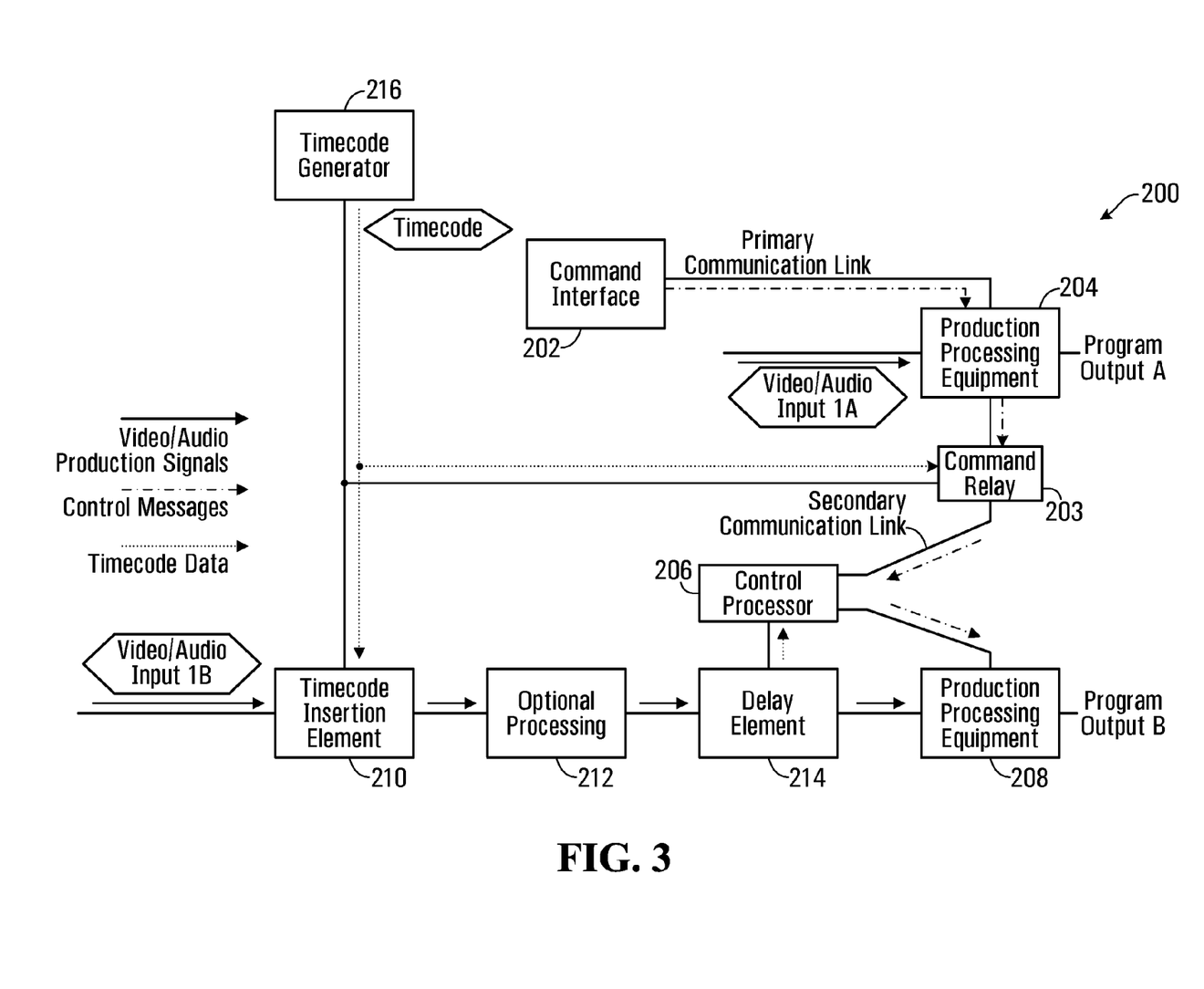
FIG. 3 is a block diagram of another example production system.

FIG. 3 is a block diagram of another example production system. The example production system 200 is substantially similar to the example production system 100 in FIG. 2, and includes a command generator 202, a command relay 203, two installations of production processing equipment 204, 208, a control processor 206, a timecode insertion element 210, an optional processing element 212, a delay element 214, and a timecode generator 216. These components in the example production system 200 may be implemented and in some cases interconnected in substantially the same manner as counterpart components in the example production system 100 in FIG. 2.

In FIG. 3, however, the command relay 203 is operatively coupled to the production processing equipment 204 instead of to the command generator 202. Thus, in the example production system 200, duplicate control messages with timing information are provided from the production processing equipment 204 to the control processor 206 via the command relay 203. In one embodiment, control commands are provided to the control processor 206 in control messages, into which the command relay 203 also embeds the timecode information. The control messages might be or include the control messages that are received by the production processing equipment 204 from the command generator 202 or messages that are generated by the command relay 203 to convey command information and timing information such as timecode information in the example shown.

The command relay 203, although shown separately from the production processing equipment 204, could be integrated into an equipment frame with the production processing equipment 204. With reference again to FIG. 1, the example production processing system 200 shown in FIG. 3 illustrates a scenario from FIG. 1 in which control messages with timing information are relayed to the secondary equipment frame 18 from the primary equipment frame 14.

The example production system shown in FIG. 3 also reflects an implementation in which timecode extraction is integrated with the delay element 214, instead of in a separate timecode extraction element.

The structure and operation of the example production system 200 is otherwise substantially similar to that of the example production system 100.

Figure 4:
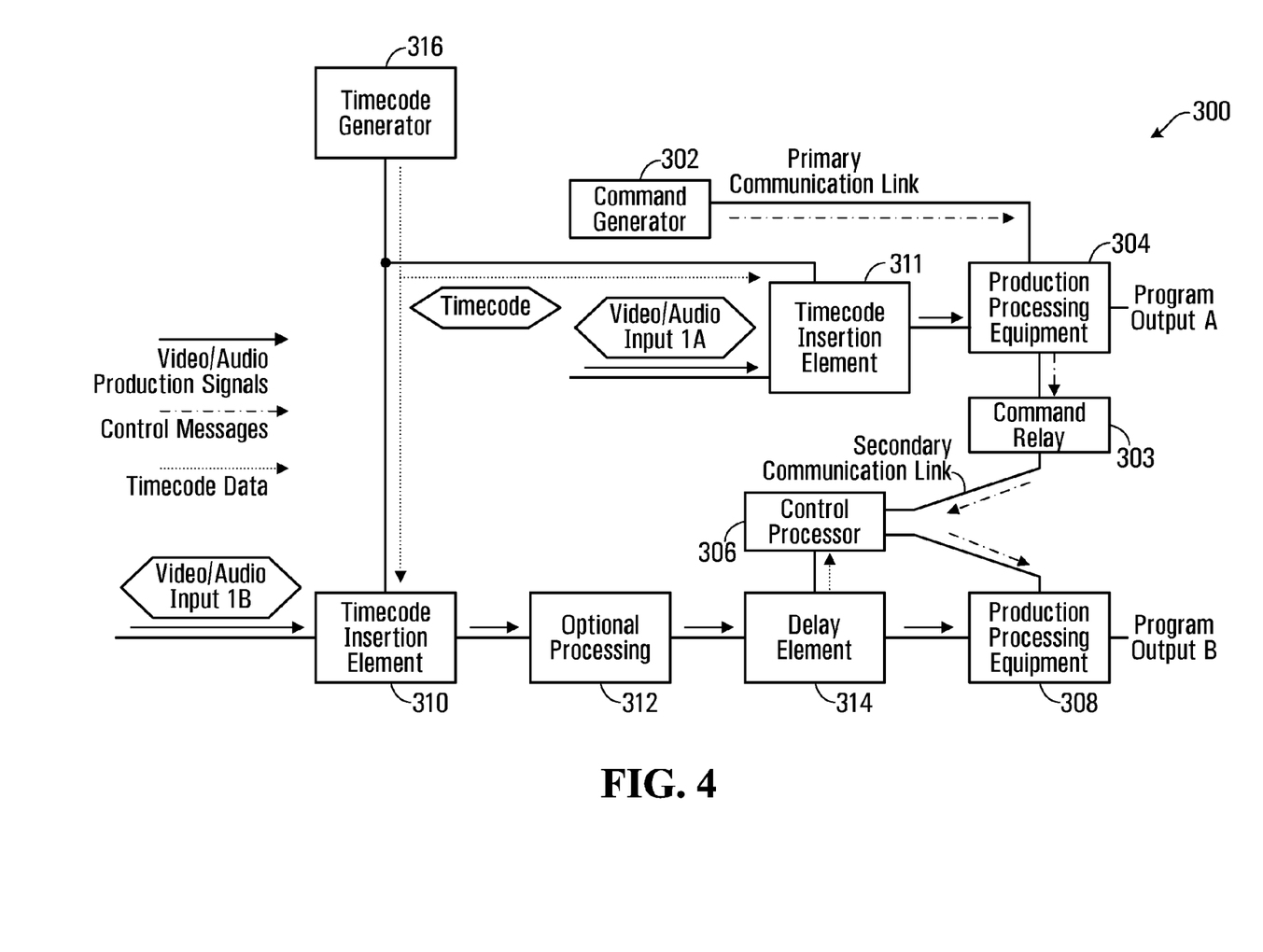
FIG. 4 is a block diagram of a further example production system.

FIG. 4 is a block diagram of a further example production system. The example production system 300 in FIG. 4 is substantially similar to the example production system 200 in FIG. 3, and includes a command generator 302, a command relay 303, two installations of production processing equipment 304, 308, a control processor 306, a timecode insertion element 310, an optional processing element 312, a delay element 314, and a timecode generator 316. These components in the example production system 300 may be implemented and interconnected in substantially the same manner as counterpart components in the example production system 200 in FIG. 3.

The example production system 300 In FIG. 4 includes another timecode insertion element 311, which inserts timecode information from the timecode generator 316 into the Video/Audio Input 1A, illustratively into the ancillary data area of at least one video signal. This timecode information is extracted by the production processing equipment 304 and provided to the command relay 303 along with control commands that are received from the command generator 302. For example, the command relay 303, which might be integrated with the production processing equipment 304, could embed the timecode information into control messages, which could be control messages that are received from the command generator 302 or generated at the command relay 303, for transmission to the control processor 306. Operation of the example production system 300 is otherwise substantially similar to that of the example production system 100.

Figure 5:
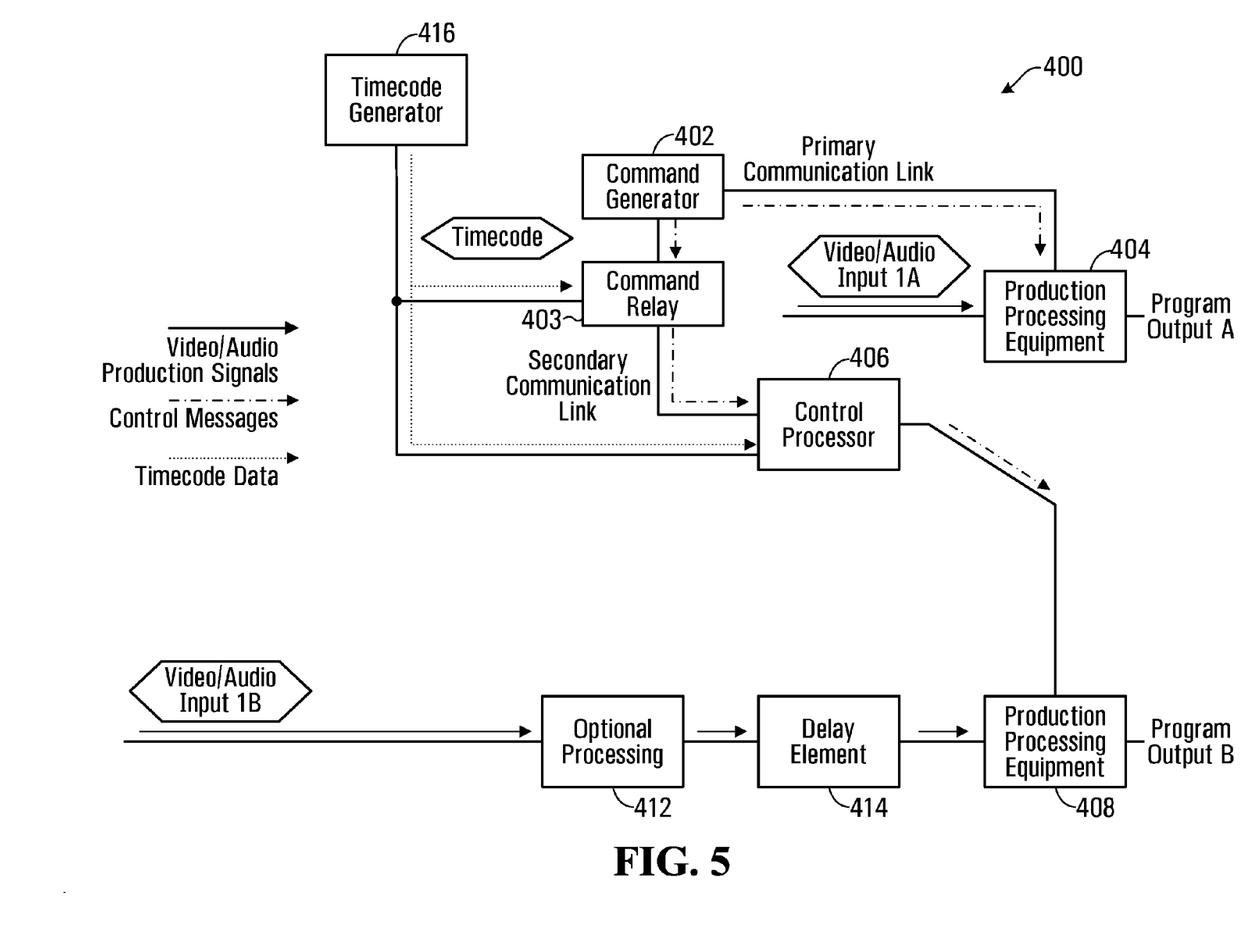
FIG. 5 is a block diagram of yet another example production system.

FIG. 5 is a block diagram of yet another example production system 400, which is substantially similar to the example production systems 200, 300 (FIGS. 3 and 4) in that it includes a command generator 402, a command relay 403, two installations of production processing equipment 404, 408, a control processor 406, an optional processing element 412, a delay element 414, and a timecode generator 416. These components in the example production system 400 may be implemented and interconnected in substantially the same manner as counterpart components in the example production systems 200, 300 in FIGS. 3 and 4.

The example production system 400, however, does not include a timecode insertion element. The timecode is instead sent to the control processor 406 directly. This type of implementation might be used, for example, when:

the time that it takes to get the timecode to the control processor 406 is a known and fixed, unchanging delay;

the delay between the Video/Audio Input 1B arriving at the production processing equipment 408 and the Video/Audio Input 1A arriving at the production processing equipment 404 is a known and fixed, unchanging delay;

only the secondary communication link has an unknown delay and jitter.

In this scenario, the control processor 406 buffers command messages such that they are properly provided to the production processing equipment 408 at a time period after the edit unit indicated by the received timecode. The control processor 406 effectively adjusts the received timecode upward by an amount based on the amount by which the Video/Audio Input 1B is delayed relative to the Video/Audio Input 1A, which is a fixed delay in this example. Such an adjustment could instead be applied by the command relay 403, by subtracting the fixed delay from the timecode. The unadjusted timecode can then be used by the control processor 406 to synchronize control of the production processing equipment 408 with control of the production processing equipment 404.

In the example production systems shown in FIGS. 2 to 5, the command relay 103, 203, 303, 403 is coupled either to the command generator 102, 402 (FIGS. 2 and 5) or to the production processing equipment 204, 304 (FIGS. 3 and 4). FIGS. 2 and 5 represent example implementations of the control panel 12 to secondary equipment frame 18 connection of FIG. 1, and FIGS. 3 and 4 represent example implementations of the primary equipment frame 14 to secondary equipment frame 18 connection of FIG. 1. The middle dashed line connection to the secondary equipment frame 18 in FIG. 1 from a point between the control panel 12 and the primary equipment frame 14 illustrates another possible option of implementing a control message duplication and relay function at some point in a primary communication link between the control panel and the primary equipment frame. This type of implementation could involve coupling a command relay to the primary communication link in FIGS. 2 to 5 and providing the secondary communication path between the command relay and the control processor 106, 206, 306, 406.

Figure 6A:
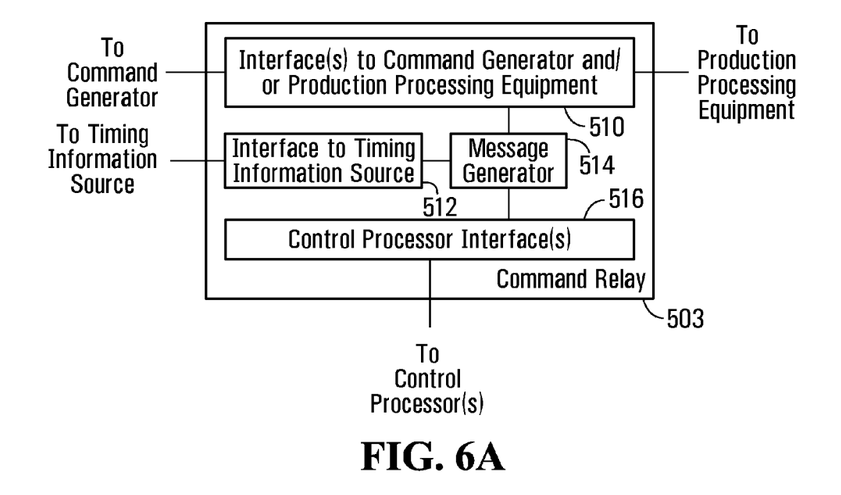
FIG. 6A is a block diagram showing an example command relay.
Figure 6B:
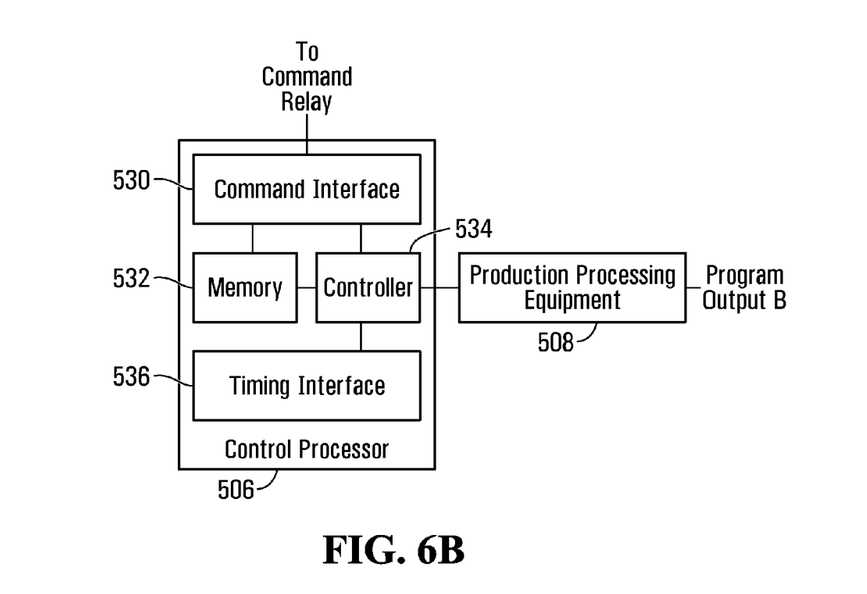
FIG. 6B is a block diagram of an example control processor.

FIGS. 1 to 5 illustrate example production systems. FIGS. 6A and 6B illustrate example apparatus implementations that provide for control synchronization. FIG. 6A is a block diagram showing an example command relay, and FIG. 6B is a block diagram of an example control processor.

The example command relay 503 (FIG. 6A) includes an interface 510 to one or both of a command generator and primary production processing equipment, an interface 512 to a timing information source, a message generator 514, and one or more control processor interfaces 516. The various interfaces 510, 512, 516 in the command relay 503 include physical components at least in the form of ports, connectors, or other types of interface components that provide for connection to some sort of communication medium. The message generator 514 could be implemented, for example, using hardware, firmware, processing devices that execute software, or some combination thereof.

The interface(s) 510 could be operatively coupled to a command generator or to primary production processing equipment, depending on which of these components provides control commands that are to be echoed to the control processor(s) of one or more installations of secondary production processing equipment. A single interface, or possibly multiple interfaces of different types for communicating with a command generator and production processing equipment, could be provided at 510.

The interface 512 enables the command relay 503 to receive timing information, which could be timecodes in some embodiments, from a timing information source. A timecode generator is an example of a timing information source from which the interface 512 could receive timing information. In some embodiments, the timing information could be received from some other element. For example, in FIG. 4, timecodes are embedded into the Video/Audio Input 1A and extracted at the production processing equipment 304. In this type of implementation, both processing control commands and timing information would be provided to the command relay 303 by the production processing equipment 304. With reference again to FIG. 5, the commands and timing information could be received from production processing equipment by the command relay 303 through one interface 510 rather than two separate interfaces 510, 512. It should therefore be appreciated that the command relay 503 need not necessarily receive timing information directly from a timing information generator such as a timecode generator, and that a separate timing information source interface 512 need not necessarily be provided in all embodiments.

The control processor interface(s) 516 could include one or more interfaces to enable control messages generated by the message generator 514 to be sent to the control processor(s) of one or more installations of secondary production processing equipment. A single interface at 516 could potentially enable communications with multiple secondary production processing equipment installations, or multiple interfaces could be provided.

As noted above, timing information could be separate from or embedded into control messages that are sent to a control processor. The message generator 514 generates control messages that include processing control commands, and could also include timing information. Timing information could instead be appended to control messages by the message generator 514, or otherwise sent to one or more control processors by the message generator with control messages. The exact format of control messages that are generated by the message generator 514 and sent to the secondary production processing equipment control processor(s) could be implementation-dependent. For example, a command generator could provide control messages to primary processing equipment in a format into which timing information can be embedded by the message generator 514. The message generator 514 could instead append timing information to control commands, encapsulate or translate control commands or messages from a command generator or primary production processing equipment into a different signal format, or otherwise prepare control commands and timing information for transmission to one or more secondary processing equipment control processors.

In operation, an interface at 510 enables the command relay 503 to receive processing control commands that are provided to production processing equipment for controlling production processing of production signals by the production processing equipment. The interface at 510 could be operatively coupled to receive the processing control commands from the production processing equipment, or from a command generator that provides the processing control commands to the production processing equipment.

A control processor interface at 516 enables communications with a controller that controls processing of delayed second production signals by second production processing equipment. There may be more than one installation of second production processing equipment in some embodiments.

The message generator 514 provides the received processing control commands, and timing information associated with edit units of the production signals for which the processing control commands control the production processing equipment, to the controller of the second production processing equipment. The processing control commands and timing information are provided to the controller for synchronizing control of production processing of the delayed second production signals by the second production processing equipment with the control of the production processing of the production signals by the production processing equipment. This allows the processing control commands to be applied to both installations of production processing equipment to control processing of related edit units, illustratively corresponding image frames or fields, of production signals. The message generator 514 could embed the timing information into messages, which also include the processing control commands, for transmission to the controller. The timing information could instead be sent to the controller separately.

As described above, the timing information could include timecode indices. In some embodiments the delayed second production signals include delayed versions of the timecode indices. At the controller of the second production processing equipment, the timecode indices that are received from the command relay and the delayed timecode indices in the delayed second production signals can be used by the controller in determining when to dispatch the processing control commands to the second production processing equipment.

The delayed second production signals need not necessarily include timecode indices or other timing information. FIG. 5, for example, illustrates an embodiment in which timecode indices are not inserted into the second production signals. In this type of implementation, where delays in a processing system are known and fixed, the production processing commands could be provided to the production processing equipment for edit units of the production signals "early", at times preceding edit units that are associated with the timing information by a time period based on an amount of delay of the delayed second production signals relative to the production signals.

Turning to FIG. 6B, the example control processor 506 includes a command interface 530, a memory 532, a controller 534, and a timing interface 536.

The command interface 530 is compatible with a control processor interface 516 (FIG. 6A). These interfaces enable processing control commands and timing information, which could, but need not necessarily, be in separate signals, to be provided to the controller 534 in the control processor 506 by the command relay 503. The command interface 530, like the control processor interface(s) 516, includes physical components at least in the form of ports, connectors, or other types of interface components that provide for connection to some sort of communication medium. Additional components to support a communication or transfer protocol over a secondary communication link (see FIGS. 2 to 5) may also be provided at and/or between the command interface 530 and a control processor interface 516.

One or more memory devices could implement the memory 532. The memory device(s) could include one or more solid state memory devices and/or memory devices with movable or even removable storage media.

The controller 534 could be implemented in hardware, firmware, and/or one or more processing devices that execute software stored in the memory 532.

The timing interface 536 includes some sort of port or connector that enables the controller 534 to receive timing information for delayed production signals that are provided to the production processing equipment 508. The structure of the timing interface 536 depends on the how timing information for delayed production signals is to be provided to the controller 534. As noted above, timing information such as timecode indices could be extracted from a delayed production signal by a control processor. In this type of implementation, the timing interface 536 could be an internal connection within a piece of equipment. Timing information could instead be extracted by a separate component with which the control processor 506 communicates through the timing interface 536 and a compatible timing interface at the separate component. In some embodiments, such as the example processing system 400 shown in FIG. 5, delayed production signals do not include timing information (i.e., no timecodes are inserted into the Video/Audio Input 1B in FIG. 4), and therefore a timing interface 536 might not be provided in all embodiments.

Considering operation of the example control processor 506, processing control commands that control production processing of edit units of first production signals by first production processing equipment, and timing information associated with the edit units of the first production signals, are received through the command interface 530 from the command relay. The command relay could be integrated into a control panel or the first production processing equipment, for example, and therefore the command interface 530 could receive the processing control commands and the timing information from the control panel or the production processing equipment. The controller 534 synchronizes control of production processing of delayed second production signals by second production processing equipment with the control of the production processing of the first production signals by the first production processing equipment.

In embodiments where the delayed second production signals include timing information associated with edit units of the delayed second production signals, the timing interface 536 could receive the timing information associated with edit units of the delayed second production signals. The controller 534 can then synchronize control of production processing of the delayed second production signals by the second production processing equipment with the control of the production processing of the first production signals by the first production processing equipment, based on the received processing control commands, the received timing information, and the timing information associated with edit units of the delayed second production signals. The timing information associated with edit units of the delayed second production signals could be generated by a timing information generator and inserted into the second production signals. Timecode generation and insertion as disclosed herein represent examples of timing information generation and insertion.

As noted above, the delayed second production signals need not necessarily include timecode indices or other timing information. Where delays in a processing system are known and fixed, the controller 534 could adjust the received timing information by a time period based on an amount of delay of the delayed second production signals relative to the first production signals.

Figure 7:
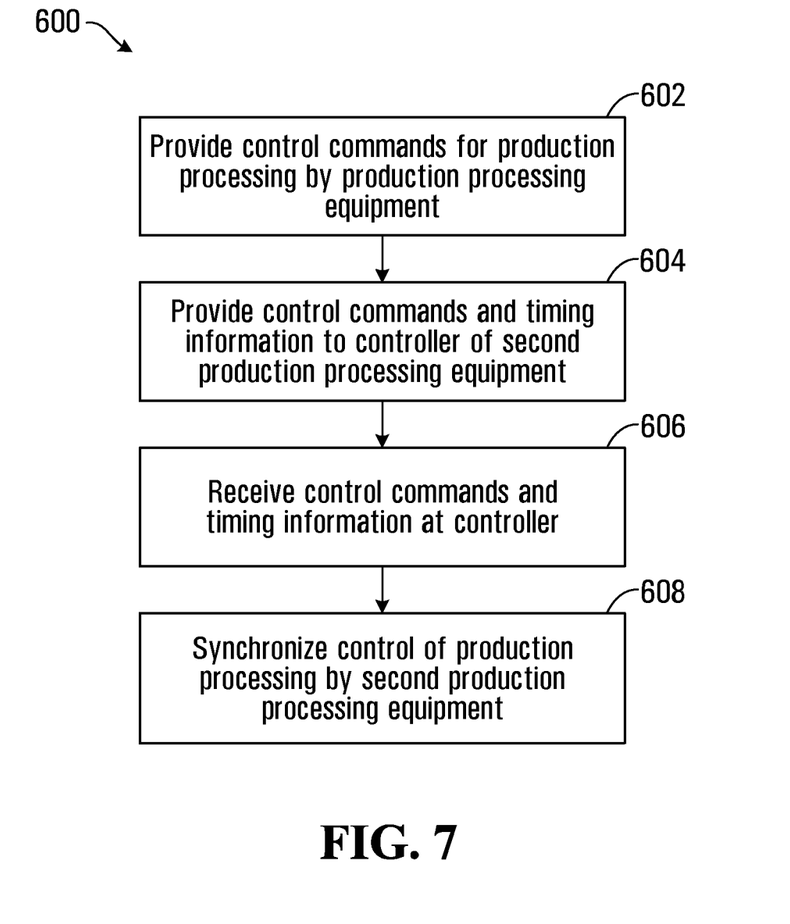
FIG. 7 is a block diagram of an example method.

FIG. 7 is a block diagram of an example method. The example method 600 involves providing processing control commands to production processing equipment for controlling production processing of production signals by the production processing equipment at 602. The processing control commands, and timing information associated with edit units of the production signals for which the processing control commands control the production processing equipment, are provided to a controller of second production processing equipment at 604, for synchronizing control of production processing of delayed second production signals by the second production processing equipment with the control of the production processing of the production signals by the production processing equipment. At 606, the processing control commands and the timing information are received at the controller of the second production processing equipment. Control of production processing of the delayed second production signals by the second production processing equipment is synchronized with the control of the production processing of the production signals by the first production processing equipment at 608.

The method 600 is intended solely for illustrative purposes, and other embodiments may involve variations of this method. For example, the operations shown in FIG. 7 could be repeated for multiple processing control commands. Further variations may be or become apparent to those skilled in the art, on the basis of FIGS. 1 to 6B and the descriptions thereof for instance. Any or all of the functions disclosed herein in the context of a system or an apparatus may similarly be embodied in a method.

Providing the processing control commands and timing information to the controller at 604, for instance, could involve inserting the timing information into a message that includes the processing control commands, and transmitting the message to the controller.

At the controller, synchronizing at 608 might involve receiving the processing control commands and the timing information, and applying the processing control commands to the second production processing equipment to control processing of the delayed second production signals. Where the delayed second production signals include timing information associated with edit units of the delayed second production signals, that timing information could be extracted from the delayed second production signals. The synchronizing at 608 could then involve synchronizing based on the received processing control commands, the received timing information, and the extracted timing information. The timing information in the delayed second production signals could be timecode indices or other timing information that is inserted into the second production signals before those signals are delayed.

What has been described is merely illustrative of the application of principles of embodiments of the invention. Other arrangements and methods can be implemented by those skilled in the art without departing from the scope of the present invention.

For example, while FIGS. 2 to 5 show only one control processor 106, 206, 306, 406 and one installation of production processing equipment 108, 208, 308, 408 controlled thereby, any number of control processors and controlled equipment could be provided, with corresponding secondary communication links for synchronization of control as disclosed herein.

The divisions of functions as shown in FIGS. 2 to 6B are also intended solely for illustrative purposes. Embodiments may be implemented with fewer, additional, and/or different components than those explicitly shown.

In addition, although described primarily in the context of production systems and methods, other implementations are also contemplated, as instructions stored on one or more non-transitory computer-readable storage media, for example.

We claim:

1. An apparatus comprising:
 a first interface to receive processing control commands that are provided to production processing equipment for controlling production processing of production signals by the production processing equipment, the production signals comprising one or more video signals, one or more video/audio signals, or both one or more video signals and one or more video/audio signals;
 a second interface to enable communications with a controller that controls production processing of delayed second production signals by second production processing equipment at a different location from the production processing equipment, the second production signals being related to the production signals; and
 a message generator operatively coupled to the first interface and to the second interface, to provide the received processing control commands, and timing information associated with edit units of the production signals for which the processing control commands control the production processing equipment, to the controller for synchronizing control of production processing by the second production processing equipment with the delayed second production signals such that the production processing of the delayed second production signals by the second production processing equipment is edit unit accurate and synchronized to match the production processing of the production signals by the production processing equipment.

2. The apparatus of claim 1, the processing control commands being provided to the production processing equipment by a command generator, the first interface being operatively coupled to the command generator to receive the processing control commands from the command generator.

3. The apparatus of claim 1, the first interface being operatively coupled to the production processing equipment to receive the processing control commands from the production processing equipment.

4. The apparatus of claim 3, further comprising:
 a timing information insertion element operatively coupled to the production processing equipment, to receive the production signals, to insert the timing information into the production signals, and to provide the production signals with the inserted timing information to the production processing equipment.

5. The apparatus of claim 1, the message generator embedding the timing information into messages comprising the processing control commands for transmission to the controller.

6. The apparatus of claim 1, the timing information comprising timecode indices and the delayed second production signals comprising the timecode indices.

7. The apparatus of claim 1, the production processing commands being provided to the production processing equipment for edit units of the production signals preceding edit units associated with the timing information by a time period based on an amount of delay of the delayed second production signals relative to the production signals.

8. A system comprising:
 the apparatus of claim 1;
 the production processing equipment; and
 the second production processing equipment.

9. An apparatus comprising:
 a command interface to receive processing control commands that control production processing of edit units of first production signals by first production processing equipment, and timing information associated with the edit units of the first production signals, the first production signals comprising one or more video signals, one or more video/audio signals, or both one or more video signals and one or more video/audio signals; and
 a controller operatively coupled to the command interface, to synchronize control of production processing of delayed second production signals by second production processing equipment at a different location from the first production processing equipment, with the delayed second production signals such that the production processing of the delayed second production signals by the second production processing equipment is edit unit accurate and synchronized to match the production processing of the first production signals by the first production processing equipment, the second production signals being related to the first production signals.

10. The apparatus of claim 9, the delayed second production signals comprising timing information associated with edit units of the delayed second production signals, the apparatus further comprising:
a timing interface to receive the timing information associated with edit units of the delayed second production signals,
the controller synchronizing control of production processing of the delayed second production signals by the second production processing equipment based on the received processing control commands, the received timing information, and the timing information associated with edit units of the delayed second production signals.

11. The apparatus of claim 10, the timing information associated with edit units of the delayed second production signals comprising timing information generated by a timing information generator and inserted into the second production signals.

12. The apparatus of claim 9, the timing information comprising timecode indices and the delayed second production signals comprising the timecode indices.

13. The apparatus of claim 9, the controller adjusting the received timing information by a time period based on an amount of delay of the delayed second production signals relative to the first production signals.

14. The apparatus of claim 9, the processing control commands comprising processing control commands generated by a control panel operatively coupled to the first processing equipment, the command interface being operatively coupled to receive the processing control commands and the timing information from the control panel.

15. The apparatus of claim 9, the command interface being operatively coupled to receive the processing control commands and the timing information from the first production processing equipment.

16. A method comprising:
providing processing control commands to production processing equipment for controlling production processing of production signals by the production processing equipment, the production signals comprising one or more video signals, one or more video/audio signals, or both one or more video signals and one or more video/audio signals; and
providing the processing control commands and timing information associated with edit units of the production signals for which the processing control commands control the production processing equipment, to a controller of second production processing equipment at a different location from the production processing equipment for synchronizing control of production processing of delayed second production signals by the second production processing equipment with the delayed second production signals such that the production processing of the delayed second production signals by the second production processing equipment is edit unit accurate and synchronized to match the production processing of the production signals by the production processing equipment, the second production signals being related to the production signals.

17. The method of claim 16, providing the processing control commands and timing information to the controller comprising:
inserting the timing information into messages comprising the processing control commands; and
transmitting the messages to the controller.

18. The method of claim 16, further comprising:
receiving the processing control commands and the timing information at the controller; and
applying the processing control commands to the second production processing equipment to control processing of the delayed second production signals.

19. A non-transitory machine-readable storage medium storing instructions which, when executed by one or more processing devices, perform the method of claim 16.

20. A method comprising:
receiving processing control commands that control production processing of edit units of first production signals by first production processing equipment, and timing information associated with the edit units of the first production signals, the first production signals comprising one or more video signals, one or more video/audio signals, or both one or more video signals and one or more video/audio signals; and
synchronizing control of production processing of delayed second production signals by second production processing equipment at a different location from the first production processing equipment, with the delayed second production signals such that the production processing of the delayed second production signals by the second production processing equipment is edit unit accurate and synchronized to match the production processing of the first production signals by the first production processing equipment, the second production signals being related to the first production signals.

21. The method of claim 20, further comprising:
providing the delayed second production signals by delaying the second production signals;
extracting from the delayed second production signals timing information associated with edit units of the delayed second production signals; and
the synchronizing comprising synchronizing based on the received processing control commands, the received timing information, and the extracted timing information.

22. The method of claim 21, further comprising, prior to the delaying:
receiving timing information for the second production signals; and
inserting the timing information for the second production signals into the second production signals.

23. A non-transitory machine-readable storage medium storing instructions which, when executed by one or more processing devices, perform the method of claim 20.

24. The apparatus of claim 1, wherein the second interface enables communications with the controller through a communication network.

25. The apparatus of claim 1, wherein the second interface enables communications with the controller through a communication link affected by jitter and/or latency.

* * * * *